(12) United States Patent
Lin

(10) Patent No.: US 10,805,387 B2
(45) Date of Patent: Oct. 13, 2020

(54) MULTIPLE-NETWORK-COMMUNITY MANAGEMENT SYSTEM AND METHOD OF MANAGING MULTIPLE NETWORK COMMUNITIES

(71) Applicant: Wei-Pin Lin, Taipei (TW)

(72) Inventor: Wei-Pin Lin, Taipei (TW)

( * ) Notice: Subject to any disclaimer, the term of this patent is extended or adjusted under 35 U.S.C. 154(b) by 173 days.

(21) Appl. No.: 15/851,728

(22) Filed: Dec. 21, 2017

(65) Prior Publication Data

US 2018/0183867 A1    Jun. 28, 2018

(30) Foreign Application Priority Data

Dec. 23, 2016    (TW) .............................. 105143081 A

(51) Int. Cl.
| | | |
|---|---|---|
| *G06F 15/16* | (2006.01) | |
| *H04L 29/08* | (2006.01) | |
| *H04L 12/58* | (2006.01) | |
| *H04W 4/21* | (2018.01) | |
| *H04W 4/02* | (2018.01) | |

(52) U.S. Cl.
CPC .......... *H04L 67/1059* (2013.01); *H04L 51/20* (2013.01); *H04L 51/32* (2013.01); *H04L 67/146* (2013.01); *H04L 67/18* (2013.01); *H04L 67/306* (2013.01); *H04W 4/02* (2013.01); *H04W 4/21* (2018.02)

(58) Field of Classification Search
USPC ....................................................... 709/204
See application file for complete search history.

(56) References Cited

U.S. PATENT DOCUMENTS

| | | | | |
|---|---|---|---|---|
| 9,552,334 | B1* | 1/2017 | Meisels | G06F 17/218 |
| 2012/0036015 | A1* | 2/2012 | Sheikh | G06Q 30/02 |
| | | | | 705/14.54 |
| 2013/0073377 | A1* | 3/2013 | Heath | G06Q 30/02 |
| | | | | 705/14.39 |
| 2013/0173402 | A1* | 7/2013 | Young | G06Q 30/0635 |
| | | | | 705/14.73 |

FOREIGN PATENT DOCUMENTS

| | | |
|---|---|---|
| CN | 102855572 A | 1/2013 |
| CN | 103309875 A | 9/2013 |
| CN | 103327054 B | 1/2016 |

* cited by examiner

*Primary Examiner* — Brian Whipple
*Assistant Examiner* — Anthony T Rotolo
(74) *Attorney, Agent, or Firm* — Cheng-Ju Chiang

(57) ABSTRACT

Disclosed herein is a multiple-network-community management system, deployed over a network architecture, which comprises a geographical information module, a member module, a network community module, a social circle module, a group module and a network operation interface. The geographical information module provides at least one geographical information. The member module provides at least one member information based on the at least one geographical region information and having a group hyperlink information corresponding to each group. The group module provides at least one group information which comprises the corresponding member information collected based on the same group hyperlink information. This can facilitate different-region groups being implemented in connection with each other, under the multiple-network-community management system, for expanding business thereamong.

13 Claims, 10 Drawing Sheets

MULTIPLE-NETWORK-COMMUNITY MANAGEMENT SYSTEM AND METHOD OF MANAGING MULTIPLE NETWORK COMMUNITIES

FIELD OF THE INVENTION

The present invention relates to a system or a method of processing network information, and in particular to, a multiple-network-community management system and a method of managing multiple network communities.

BACKGROUND OF THE INVENTION

Currently, there were various matters occurring in the known network communities (such as FACEBOOK, LINE, What's app, WeChat, Twitter and so forth) as follows. 1. Due to deficiency of efficient business models therein, this causes that their users cannot efficiently and directly engage in commercial activities based on the network under interfaces of those network communities; 2. Although those network communities all can render a function of establishing an individual group, such a group may be opened for the world/regionality but it is difficult to develop various kinds of continuous and actual exchange activities among the members of the same/different property network groups; and 3. The conventional network communities lack effective information classification in search, such that their users need to spend plenty of time for seeking a group what he/she requires. In an event, if intending to look up a specific yoga course located in Taipei city, only one thing that a user can do is helplessly searching it line-by-line on the globalized network communities or the Internet. This would waste lots of user's time to identify which of the huge amounts of network information is correct or not.

Therefore, to overcome the aforementioned drawbacks, it is very essential to provide a multiple-network-community management system and a method thereof, which are capable of efficiently facilitating flows of a variety of regionalized business models based on among multiple globalized network communities, by way of different-level classified network information management.

SUMMARY OF THE INVENTION

In order to solve the aforementioned technical problems of the conventional art, an objective of the present invention is to provide a multiple-network-community management system and a method of managing multiple network communities, which data-relatively interconnect the information provided from a member module and a group module with a geographic information module, so as to regionally classify each of groups of the multiple globalized network communities in search under a globalized Information architecture (such as the Internet), thereby increasing actual exchanges and interactions occurring among global members of each of the groups.

Another objective of the present invention is to provide a multiple-network-community management system and a method of managing multiple network communities, which utilize multi-level information-classified architecture for managing and data-relatively interconnecting a variety of network information including geographic information, member information, group information, community circle information and network community information.

Another objective of the present invention is to provide a multiple-network-community management system and a method of managing multiple network communities, which efficiently facilitate flows of a variety of regionalized business models based on among multiple globalized network communities, by way of different-level classified network information management.

To accomplish the above objectives, the present invention provides a network community management system, which comprises a geographic information module, a member module, a group module and a network operation interface. The multiple-network-community management system is deployed on a basis of a network architecture.

The geographic information module provides at least one geographic region information. The member module is actuated in cooperation with the geographic information module, to provide at least one member information, based on the at least one geographic region information. The at least one member information comprises at least one group hyperlink information. The group module is actuated in cooperation with the geographic information module and the member module, to relatively provide at least one group information based on the at least one geographic region information. The at least one group information comprises the at least one member information which is collected on a basis of the at least one group hyperlink information. The network operation interface is configured to visually display the at least one geographic region information in a selectable form on at least one guest terminal connected to the network architecture, and further visually display the at least one group information in a selectable form, based on determined one of the at least one geographic region information.

In a preferred embodiment, the at least one member information comprises a plurality of different group hyperlink information.

In a preferred embodiment, the network operation interface is configured to visually display the at least one member information included within determined one of the at least one group information and based on determined one of the at least one group information.

In a preferred embodiment, one of the member information of determined one of the at least one group information further comprises a preset network hyperlink used to activate an electronic communication through the network operation interface.

In a preferred embodiment, the multiple-network-community management system further comprises at least one trading/marketing module which is configured to be actuated in cooperation with the group module, for generating a network trading/marketing information.

In a preferred embodiment, the multiple-network-community management system further comprises a subgroup module, which individually cooperates with the at least one trading/marketing module and the member module to actuate, only for a member joining a subgroup of the subgroup module to activate an electronic communication via a preset network hyperlink.

In a preferred embodiment, the at least one trading/marketing module further comprises a payment flow module which is configured to generate at least one network payment procedure corresponding to the at least one network trading/marketing information, wherein the subgroup module is selectably connected to said payment flow module.

In a preferred embodiment, the multiple-network-community management system further comprises a commodity supplier terminal which is configured to implement a commodity supply in accordance with the network trading/marketing information.

In a preferred embodiment, the multiple-network-community management system further comprises a chat module, a bulletin module and an audio/visual module. The member module is configured to cooperate with the chat module, so as to activate an electronic communication via a preset network hyperlink. The group module is configured to announce at least one bulletined news with the bulletin module. The member module is configured to cooperate with the audio/visual module, so as to upload a multimedia information therefrom. The chat module, the bulletin module and the audio/visual module are respectively actuated in cooperation with the subgroup module.

In a preferred embodiment, the at least one guest terminal sends a score message back to the system after finishing the electronic communication via the preset network hyperlink.

To accomplish the aforementioned objectives, the present invention provides a method of managing multiple network communities, which comprises: firstly, using a geographic information module to provide at least one geographic region information; next, actuating a member module in cooperation with the geographic information module to provide at least one member information based on the at least one geographic region information, wherein the at least one member information comprises at least one group hyperlink information; next, actuating a group module in cooperation with the geographic information module and the member module, to relatively provide at least one group information based on the at least one geographic region information, wherein the at least one group information comprises the at least one member information collected on a basis of the at least one group hyperlink information; and next, on at least one guest terminal connected to the network architecture, using a network operation interface to visually display in turns the at least one geographic region information in a selectable form, and then the at least one group information in a selectable form based on determined one of the at least one geographic region information.

In a preferred embodiment, the method of managing multiple network communities further comprises a step of: using the network operation interface to visually display the at least one member information included within and based on determined one of the at least one group information.

In a preferred embodiment, one of the member information of determined one of the at least one group information further comprises a preset network hyperlink used to activate an electronic communication through the network operation interface.

In a preferred embodiment, the method of managing multiple network communities further comprises a step of: actuating at least one trading/marketing module in cooperation with the group module to generate a network trading/marketing information.

In a preferred embodiment, the method of managing multiple network communities further comprises a step of: actuating a subgroup module in respective cooperation with the at least one trading/marketing module and the member module, so as to activate an electronic communication via a preset network hyperlink, only for a member joining a subgroup in the subgroup module.

In a preferred embodiment, the method of managing multiple network communities further comprises: using a payment flow module of the at least one trading/marketing module to generate at least one network payment procedure corresponding to the at least one network trading/marketing information, wherein the subgroup module is selectably connected to said payment flow module.

In a preferred embodiment, the method of managing multiple network communities further comprises: a commodity supplier terminal implementing a commodity supply in accordance with the network trading/marketing information.

In a preferred embodiment, the method of managing multiple network communities further comprises a chat module, a bulletin module and an audio/visual module. The member module is configured to cooperate with the chat module, so as to activate an electronic communication via a preset network hyperlink. The group module is configured to cooperate with the bulletin module, to announce at least one bulletined news. The member module is configured to cooperate with the audio/visual module, so as to upload a multimedia information therefrom. The chat module, the bulletin module and the audio/visual module are respectively actuated in cooperation with the subgroup module.

In a preferred embodiment, the method of managing multiple network communities further comprises a step of: the at least one guest terminal sending a score message back to the system after finishing the electronic communication via the preset network hyperlink.

To accomplish the aforementioned objectives, the present invention provides another multiple-network-community management system. The multiple-network-community management system comprises a geographic information module, a member module, a network community module, a social circle module, a group module and a network operation interface. The multiple-network-community management system is deployed on a basis of a network architecture.

The geographic information module provides at least one geographic region information. The member module is actuated in cooperation with the geographic information module, so as to relatively provide at least one member information based on the at least one geographic region information. The at least one member information comprises at least one group hyperlink information. The network community module is actuated in cooperation with the geographic information module, so as to relatively provide at least one network community information based on the at least one geographic region information. The social circle module is actuated in cooperation with the geographic information module and the network community module, so as to relatively provide at least one social circle information based on the at least one geographic region information and the at least one network community information. The group module is actuated in cooperation with the member module and the social circle module, so as to relatively provide at least one group information based on the at least one geographic region information and the at least one social circle information. The at least one group information comprises the at least one member information collected on a basis of the at least one group hyperlink information. On at least one guest terminal connected to the network architecture, the network operation interface is configured to visually display in turns the at least one geographic region information in a selectable form, the at least one network community information in a selectable form based on determined one of the at least one geographic region information, the at least one social circle information in a selectable form based on determined one of the at least one network community information, and the at least one group information in a selectable form based on determined one of the at least one social circle information.

In a preferred embodiment, the at least one member information comprises a plurality of different group hyperlink information.

In a preferred embodiment, the network operation interface is configured to visually display the at least one member information based on and included within determined one of the at least one group information.

In a preferred embodiment, one of the member information of determined one of the at least one group information further comprises a preset network hyperlink used to activate an electronic communication through the network operation interface.

In a preferred embodiment, the network operation interface is configured to visually display the at least one member information based on and included within determined one of the at least one social circle information.

In a preferred embodiment, one of the member information of determined one of the at least one social circle information further comprises a preset network hyperlink used to activate an electronic communication through the network operation interface.

In a preferred embodiment, the network operation interface is configured to visually display the at least one member information based on and included within determined one of the at least one network community information.

In a preferred embodiment, one of the member information of determined one of the at least one network community information further comprises a preset network hyperlink used to activate an electronic communication through the network operation interface.

In a preferred embodiment, the multiple-network-community management system further comprises at least one trading/marketing module which is configured to be actuated in cooperation with the group module, for generating a network trading/marketing information.

In a preferred embodiment, the multiple-network-community management system further comprises a subgroup module which is actuated in respective cooperation with at least one trading/marketing module and the member module, only for a member joining a subgroup in the subgroup module an electronic communication via a preset network hyperlink.

In a preferred embodiment, the at least one trading/marketing module further comprises a payment flow module which is configured to generate at least one network payment procedure corresponding to the at least one network trading/marketing information, the subgroup module is selectably connected to said payment flow module.

In a preferred embodiment, the multiple-network-community management system further comprises a commodity supplier terminal which is configured to implement a commodity supply in accordance with the network trading/marketing information.

In a preferred embodiment, the multiple-network-community management system further comprises a chat module, a bulletin module and an audio/visual module. The member module is configured to cooperate with the chat module so as to activate an electronic communication via a preset network hyperlink. The group module is configured to cooperate with the bulletin module so as to announce at least one bulletined news. The member module is configured to cooperate with the audio/visual module so as to upload a multimedia information. The chat module, the bulletin module and the audio/visual module are respectively actuated in cooperation with the at least one subgroup module.

In a preferred embodiment, the at least one guest terminal sends a score message back to the system after finishing the electronic communication via the preset network hyperlink.

In a preferred embodiment, the at least one guest terminal sends a score message back to the system after finishing the electronic communication via the preset network hyperlink.

In a preferred embodiment, the at least one guest terminal sends a score message back to the system after finishing the electronic communication via the preset network hyperlink.

In a preferred embodiment, said multiple-network-community management system further comprises: the at least one guest terminal having a terminal processor, and an executing module including the network operation interface, wherein the terminal processor is configured to control the executing module; and at least one webpage server connected to the network architecture, having a service processor, a management unit and a client database, wherein the management unit further comprises the geographic information module, the member module, the network community module, the social circle module and the group module, the service processor is configured to control the management unit and the client database, the executing module is actuated in cooperation with the management unit through the network architecture, so as to make the multiple-network-community management system performing at least one service task, the at least one service task comprises the network operation interface visually displaying in turns the at least one geographic region information, the at least one network community information, the at least one social circle information, the at least one group information and the at least one member information on the at least one guest terminal.

In a preferred embodiment, said at least one guest terminal further comprises at least one community applying module, wherein the network operation interface is utilized to activate the at least one community applying module, thereby transmitting an external community message, containing a URL of the webpage server, to a thirty-party terminal through the network architecture and an external community server corresponding to the at least one community applying module, the thirty-party terminal uses the external community message in connection with the management unit of the webpage server, for achieving services provided from the multiple-network-community management system.

In a preferred embodiment, the client database of the webpage server is configured to store a multi-level information-classified architecture therein, the multi-level information-classified architecture depends different property and levels of each of the various information to define various relationships among the at least one geographic region information, the at least one network community information where the at least one geographic region information correspond, the at least one social circle information where the at least one network community information correspond, the at least one group information where the at least one social circle information correspond, the at least one member information where the at least one group information correspond, and the group hyperlink information where the at least one member information correspond.

In a preferred embodiment, the network operation interface further comprises a classification-based information searchable menu, the classification-based information searchable menu achieves the multi-level information-classified architecture from the client database of the webpage server, for sequentially searching the at least one geographic region information, the at least one network community information, the at least one social circle information, the at least one group information, the at least one member information, and the at least one member information therefrom.

In a preferred embodiment, the network operation interface further comprises a classification-based information settable menu, the classification-based information settable menu is configured to access the multi-level information-classified architecture from the client database of the webpage server; and the management unit further comprises a convener module, wherein by the classification-based information settable menu and the convener module, the at least one member information is used to pre-create a new group information, and then the at least one geographic region information where the newly-created group information belong, the at least one network community information, and the at least one social circle information are sequentially determined, for being saved back to the client database to redefined the multi-level information-classified architecture.

In a preferred embodiment, the at least one member information comprises a convener information where the newly-created group information belong, and an enquiry service information on a basis of the convener information, the enquiry service information comprises a preset network hyperlink where the at least one member information belong, for activating an electronic communication.

DETAILED DESCRIPTION OF THE PREFERRED EMBODIMENTS

Figure 1:
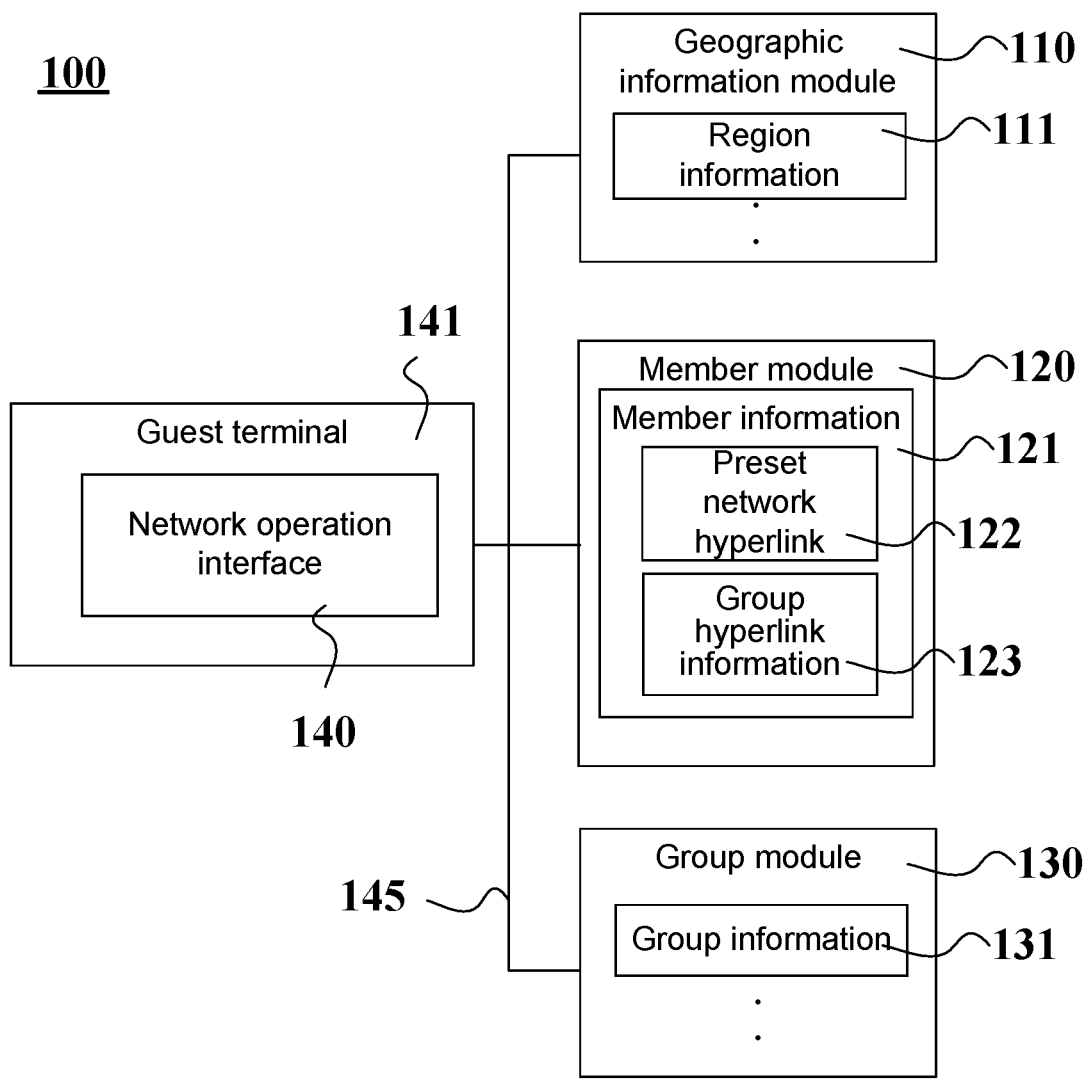
FIG. 1 depicts a schematically architectural diagram of a multiple-network-community management system of a first preferred embodiment in accordance with the present invention.

To easily realize the aforementioned objectives, characteristics and advantages of the present invention, the following description is given by way of illustration with reference to the specific embodiments in which the disclosure may be practiced, with accompanying the drawing(s) related thereto. The various terms described in the description is merely used to describe and to understand the present disclosure but not to limit the claim scope of the present disclosure.

FIG. 1 depicts a schematically architectural diagram of a multiple-network-community management system 100 of a first preferred embodiment in accordance with the present invention. The multiple-network-community management system 100 comprises a geographic information module 110, a member module 120, a group module 130 and a network operation interface 140. The multiple-network-community management system 100 is deployed on a basis of a network architecture 145.

The geographic information module 110 provides a geographic region information 111. The geographic region information 111 includes, information regarding different geographic regions, for example, cities (such as Taipei City, Tokyo City or New York City and so forth), downtowns, metropolitan area, living circles or countries and so forth, for region information classification. Briefly speaking, the geographic information module 110 can assist the user in firstly filtering the information in accordance with its regionality before selecting which of groups the use wants, such that the users can more rapidly select a region where the group is located; in another aspect, it increases convenience and chances on interactions generated among the users and the groups in real life. The member module 120 is actuated in cooperation with the geographic information module 110 so as to provide a member information 121 based on the geographic region information 111. Each of the member information 121 comprises a group hyperlink information 123. For example, a group list lists which of groups a member 'Andy Wang' joins, including Teacher Chang's yoga course, Teacher He's tchoukball course and so forth. The group module 130 and the geographic information module 110 are actuated in cooperation with the member module 120 so as to provide a group information 131 based on the geographic region information 111, relatively. In an exemplar, while an user selects 'Taipei city' from the geographic region information, the group module 130 relatively provides the group information 131 groups of which are located in Taipei city. The group information 131 can contain different groups, like Teacher Cheng's yoga course, Teacher Lee's ballroom dancing course and so forth, wherein each of the groups can consist of different members having different hobbits. Each of the group information 131 comprises the member information 121 which are collected on a basis of the same group hyperlink information 123. The network operation interface 140 connected to the network architecture 145 is configured to visually display the geographic region information 111 in a selectable form on a guest terminal 141 (e.g. a smart phone) so as to further visually display the group information 131 in a selectable form based on the selected geographic region information 111. While the multiple-network-community management system 100 is activated, a geographic region information 111 can be selected by an user via the geographic information module 110; next, by the selected geographic region information 111, lost of different group information 131 corresponding to the selected geographic region information 111 can be achieved by the user.

Generally speaking, the geographic information module 110 is configured to provide 'Location-Based Service' (LBS) information. A basal principle of LBS is that while a client's mobile terminal needs an information service or an inspecting management center needs to perform removal calculations for someone mobile terminal, firstly the mobile terminal (namely the network operation interface 140) achieves the last spatial location data from itself by its embedded positioning module therein. The achieved data is real-time uploaded by wireless telecommunication to the management center; then, a geographic information system (GIS) server of the management center, in accordance with the terminal's geographic location, requests spatial analysis, and makes decision, thereby downloading messages corresponding to the last spatial location data of the terminal to the mobile terminal. In the other word, with LBS, the user can more rapidly achieves the messages (e.g. with regard to clothing, foods, home livings, traffics, educations, or entertainments and so on) related to the last spatial location data of its terminal. With applying LBS, this can increase a regional relationship among the network communities which originally lack the regional relationship thereamong, such that the network communities can obtain a higher possibility to generate interaction thereamong in real life. In practice, the network operation interface 140 is configured to visually display the member information 121 included within and based on the selected group information 131, i.e. the network operation interface 140 can visually display all of the member information 121 contained in the selected group information 131. If browsing a group information 131 regarding 'Teacher Lee's yoga course', a user can know the member information of all members in 'Teacher Lee's yoga course', including, for example, 'Teacher Lee', 'Mary Chang', 'David He' . . . .

The multiple-network-community management system 100 of the present invention can be rendered in a webpage or mobile application (APP) form.

Preferably, since a common member might not join only one group but also joins different groups, the member information 121 comprises group hyperlink information 123 respectively corresponding to a plurality of different group where the same member joins. For example, an user can achieve different group hyperlink information 123, from one specific member information 121, corresponding to different groups that the specific member joins. If the user is interested in one of the groups where the specific member joins, the user can hyperlink the group information 131 of the interested group by way of the corresponding group hyperlink information 123, and even further activates an electronic communication with another member in the interested group via a preset network hyperlink 122 from the network operation interface 140, i.e. an user can intercommunicate with one specific member of any one group by way of any one private message approach in typical. This portion functions as so-called "enquiry service", an actual application of which is exemplified that after picking a interested group by the group hyperlink information 123 corresponding to the interested group information, an user can firstly inquire one specific member jointed in the interested group about the required information of the interested group, via the preset network hyperlink 122 with corresponding to the specific member and from the network operation interface 140, rather than inquiring question in a limited manner when finishing joining of the interested group. Nevertheless, the preset network hyperlink 122 for the electronic communication does not only functions on providing an electronic conversation function for the user, but after each of the electronic communication via the preset network hyperlink 122 is finished, a score message regarding the specific member can also be evaluated and then sent back from the user's terminal 141 to the system 100 and the specific member via the preset network hyperlink 122. For example, the score message may be evaluated in a range from 1 to 5. The higher satisfaction the user feels for the specific member answering to the enquiry, the higher score the specific member earns. The multiple-network-community management system 100 will score and record the evaluated scores into the specific member's the member information 121, in accordance with each score message the users send back. This will be beneficial to lead other users to pick one member who has the higher scope, for inquiring question.

Figure 2:
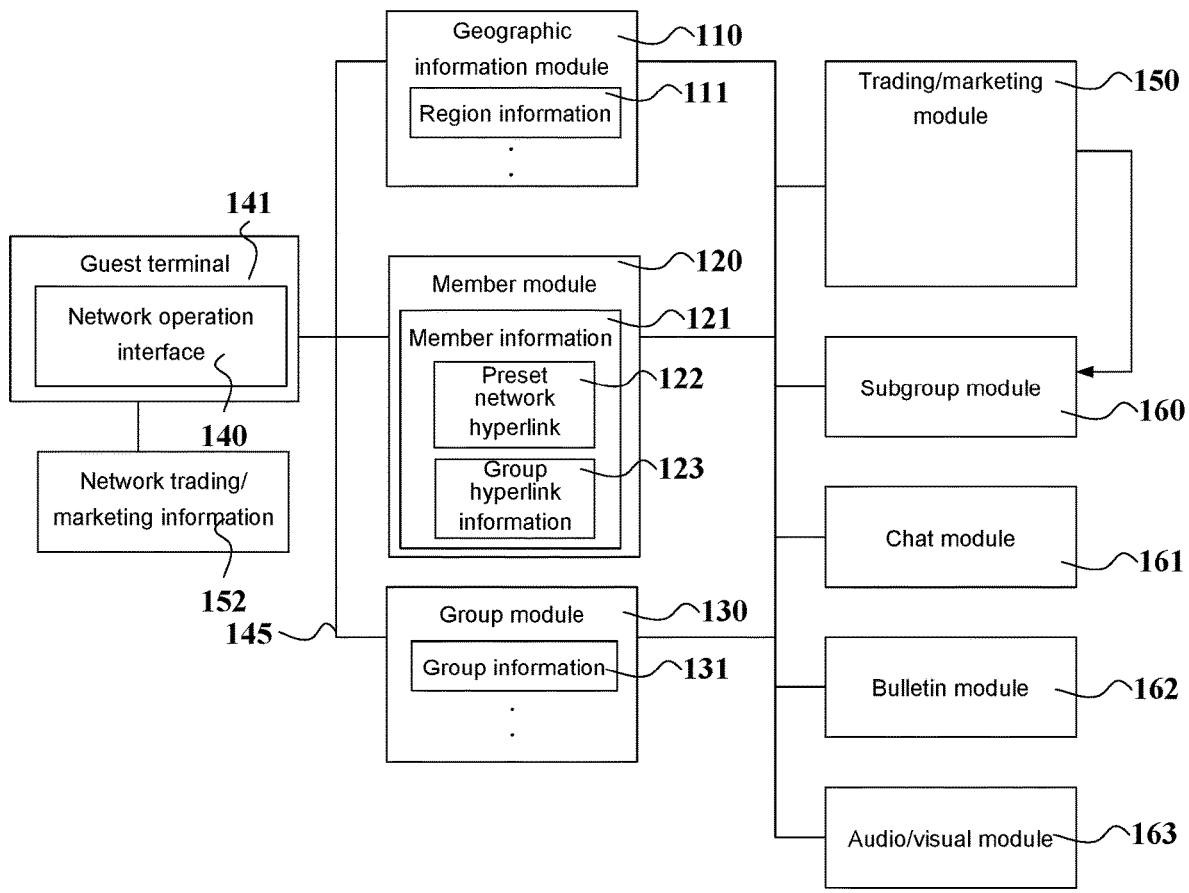
FIG. 2 depicts a schematically architectural diagram of a multiple-network-community management system of a second preferred embodiment in accordance with the present invention.

FIG. 2 depicts a schematically architectural diagram of a multiple-network-community management system 200 of a second preferred embodiment in accordance with the present invention, which differs from the above-mentioned first preferred embodiment in the multiple-network-community management system 200 further increasingly comprising a trading/marketing module 150, a subgroup module 160, a chat module 161, a bulletin module 162 and an audio/visual module 163 therein.

All of the members contained in the member information 121 provided by the member module 120 have to employ the chat module 161 in connection with the preset network hyperlink 122 for the electronic communications on chat. The group module 130 can be configured to announce bulletin news through the bulletin module 162. The members of the member module 120 can employ the audio/visual module 163 to upload a multimedia information from their terminals. In other words, the multiple-network-community management system 200 also has a chat function, a bulletin function and an audio/visual function as well as the common community website(s) having.

The chat module 161, the bulletin module 162 and the audio/visual module 163 (e.g. an electronic photo album) are respectively actuated in cooperation with the subgroup module 160. Preferably, All of the members contained in the member information provided by the group module 130 and collected on a basis of the same group hyperlink information 123, all employ the subgroup module 160 to establish a subgroup (like a private subgroup). In the subgroup, an electronic communication can be activated via the preset network hyperlink 122 for establishing private-group intercommunication. The subgroup module 160 provides a primary function that more than three of the members contained in the same group can establish a subgroup together, for making intercommunications thereamong. If there are only two of the members contained in the same group, it is rendered in establishing an electronic communication therebetween via the preset network hyperlink 122.

While the group module 130 is actuated in cooperation with the trading/marketing module 150, a network trading/marketing information 152 is generated from the trading/marketing module 150. The network trading/marketing information 152 actual provides various kinds of activity information and commodity information. In other words, the multiple-network-community management system 200 of the present invention can provide an architecture where any user (no matter whether the user is the group members or not) operating in the multiple-network-community management system 200 is capable of holding an activity or marketing commodities. This does not restrict the user to the group member only in joining the activity or purchasing the commodities. Nevertheless, noted is that, the users that does not belong to the group cannot join a subgroup provided by the subgroup module 161 and cannot establish an activity. Some restriction about establishment of the activities, can be referred to the following description.

In this embodiment, the members joining a subgroup provided by the subgroup module 161 can establish a free-charged or charged information for the activities in the corresponding subgroup. After an user joins a free-charged activity, the subgroup module 161 will actively make the user to join a subgroup, thereby achieving directly an information relative to the free-charged activity. However, this does not limit thereto, accordingly. The multiple-network-community management system 200 can selectably stop the transmission of the information relative to the charged activity in the subgroup module 161.

Figure 3:
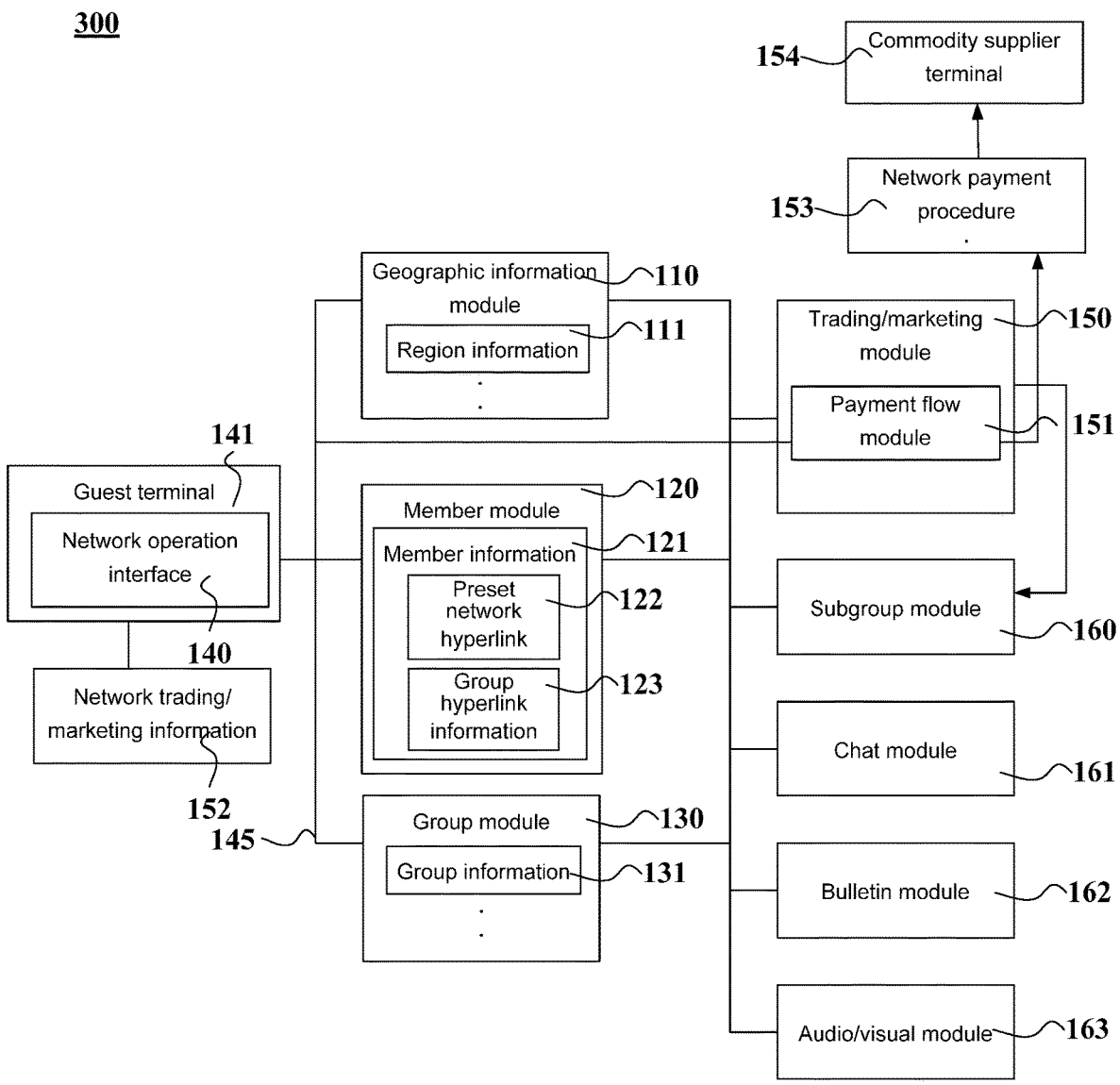
FIG. 3 depicts a schematically architectural diagram of a multiple-network-community management system of a third preferred embodiment in accordance with the present invention.

FIG. 3 depicts a schematically architectural diagram of a multiple-network-community management system 300 of a third preferred embodiment in accordance with the present invention, which differs from the above-mentioned second preferred embodiment in increasing a commodity supplier terminal 154.

The trading/marketing module 150 is actuated in cooperation with the group module 130, for generating a network trading/marketing information 152, and then visually displaying the network trading/marketing information 152 through the network operation interface. One of the members of the group (In general, the user may limit to the group manager) can employ the group module 130 to generate or establish messages relative to charged activities or free-charged activities, whereby the other respective users can employ the network operation interface 140 to achieve information about activity. The trading/marketing module 150 comprises a payment flow module 151. The payment flow module 151 is configured to generate a network payment procedure 153 corresponding to the network trading/marketing information 152. The payment flow module 151 can directly charge the member who joins the activity held in the group. In actual practice, the payment flow module 151 can be connected to any one third-party payment system. In another embodiment, after a member joins a charged activity and finishes its payment, the subgroup module 160 will actively make the member (as the corresponding member information) joining a newly-established subgroup, and make the members of the subgroup, who have finished the payment, can intercommunicate thereamong through an electronic communication by the preset network hyperlink 122.

In the operation, the user's a message interface is activated in a form of a dialog box (as an electronic communication via a preset network hyperlink 122), for rendering intercommunication, group messages and subgroup messages (if there is someone joining the subgroup).

Next, the commodity supplier terminal 154 is configured to implement commodity supply in accordance with the network trading/marketing information 152. The network trading/marketing information 152 comprises an information how many members finish the network payment procedure. The commodity supplier terminal 154 can control commodity supply in zero-inventory level in accordance with the network trading/marketing information 152. In an exemplar, if a dancing party is intended to take place, after determining the number of joining members, different-size sites can be selected to control rent cost, in accordance with the member number. If there is a requirement for yoga pad, after the member number and the ordered amount is determined, the yoga pads as the ordered amount can be provided by the factory.

In other words, different network groups can act as a visualized shop to provide services (e.g. a sport teaching) or products (e.g. a fitness product). Differently from various kinds of smaller traditional, physical enterprises and the like shops which do not only run business with regionally-limited customers but also lack a mechanism for real-time interaction with the clients, the multiple-network-community management system 300 of the present invention can not only provide more real-time interactions between the clients and the shops but can also provide services for globalized clients to increase their revenues and is beneficial to trading probability appearing among the groups and the member.

Figure 4:
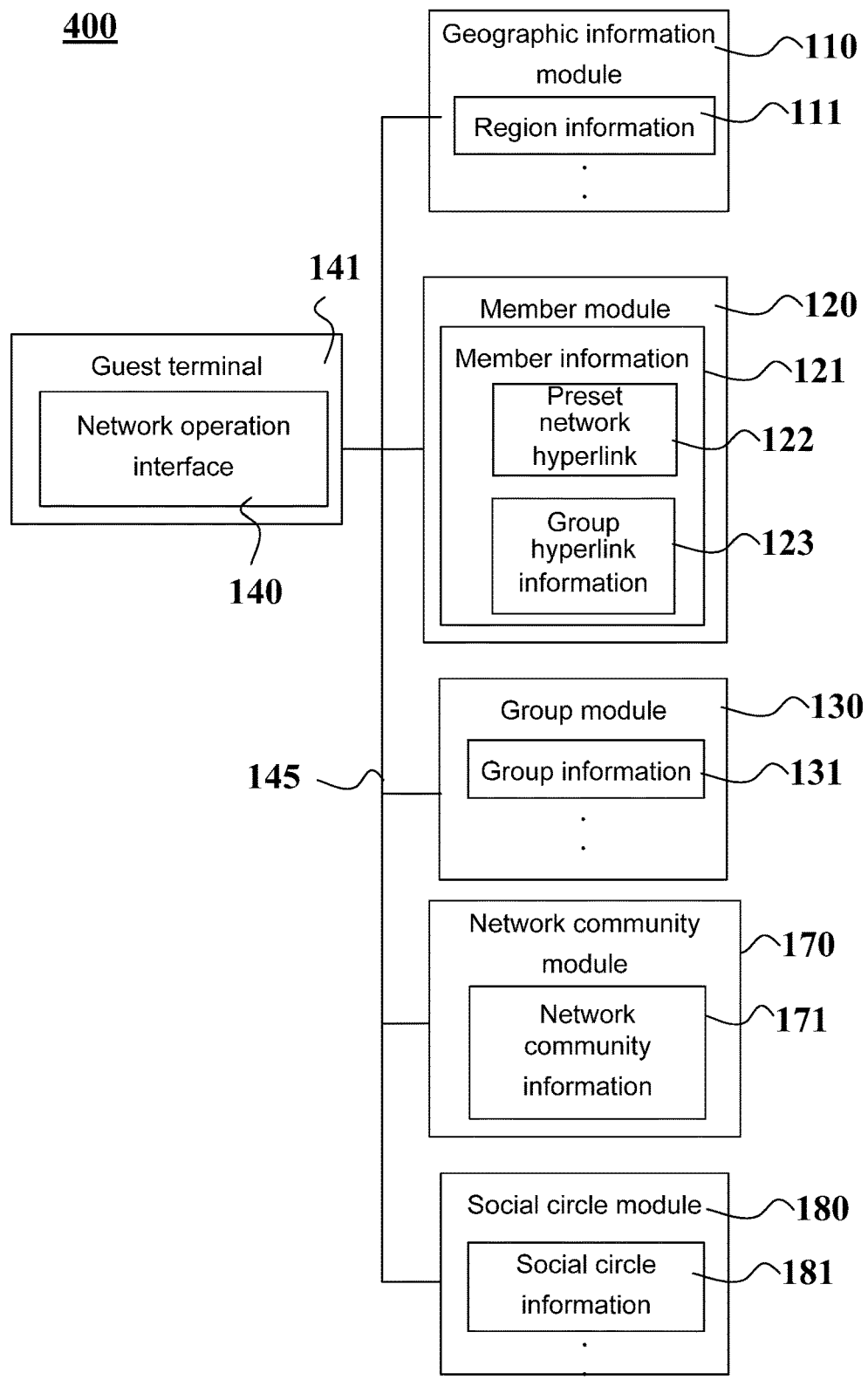
FIG. 4 depicts a schematically architectural diagram of a multiple-network-community management system of a fourth preferred embodiment in accordance with the present invention.

FIG. 4 depicts a schematically architectural diagram of a multiple-network-community management system 400 of a fourth preferred embodiment in accordance with the present invention, which differs from the above-mentioned first preferred embodiment in increasing a network community module 170 and a social circle module 180. The network community module 170 is actuated in cooperation with the geographic information module 110 so as to relatively provide at least one network community information 171 based on the geographic region information 111. In an exemplar, the at least one network community information 171 can comprises an arts community and a sport community. The social circle module 180 is actuated in respective cooperation with the geographic information module 110 and the network community module 170 so as to relatively provide a social circle information 181 based on the geographic region information 111 and the at least one network community information 171. In an exemplar, the social circle information 181 can comprise a yoga social circle and/or a jogging social circle. Continuing to introduce the at least one network community information 171, after a sport community is selected, a yoga social circle can be further selected by a user. The group module 130 is actuated in respective cooperation with the member module 120 and the social circle module 180 so as to relatively provide the group information 131 based on the geographic region information 111 and the social circle information 181. The group information 131 comprises the member information 121 collected on a basis of the same group hyperlink information 123. While a user in turns determines proper one of the network community information 171 (e.g. a sport community), proper one of the social circle information 181 (e.g. a yoga social circle), and proper one of the group information 131 (e.g. Teacher Cheng's yoga course). Briefly, the network community module 170, the social circle module 180 and the group module 130 constitutes into an upstream-to-downstream multi-level information classification, which provides the users with a multi-level filtering function for the required network information.

On a guest terminal 141 connected to the network architecture 145, the network operation interface 140 is configured to visually display the geographic region information 111 in a selectable form; then, to further visually display at least one network community information 171 in a selectable form based on determined one of the geographic region information 111 where a geographic region corresponds; then, to further visually display a social circle information 181 in a selectable form based on determined one of the at least one network community information 171 where a community corresponds; and then, to visually display a group information 131 in a selectable form based on determined one of the social circle information 181 where a social circle corresponds. With the multiple-network-community management system 400 in accordance with the present invention, firstly the geographic region information 111 are regionally filtered in this regional level classification, and next the network community information, the social circle information and the group information are respectively filtered in turns by the network community, the social circle and the group level classifications. This can easily connect different over-world groups having the same property in series, thereby being capable of making various kinds of groups such as traditional local enterprises to develop into global multinational corporations, in addition to facilitate the group members conveniently real-time intercommunicating with the over-world others having the same hobbit.

Figure 5:
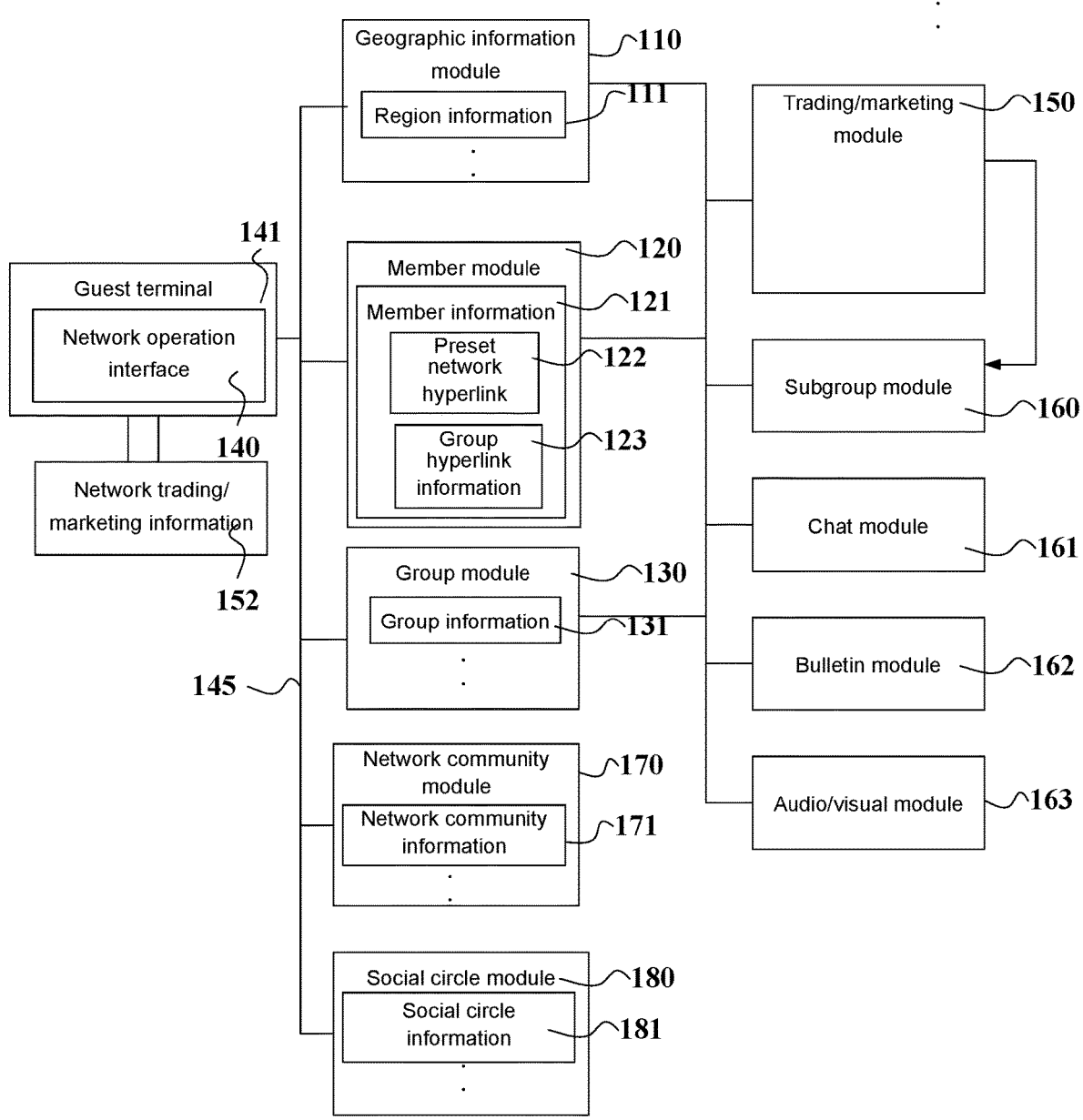
FIG. 5 depicts a schematically architectural diagram of a multiple-network-community management system of a fifth preferred embodiment in accordance with the present invention.

FIG. 5 depicts a schematically architectural diagram of a multiple-network-community management system 500 of a fifth preferred embodiment in accordance with the present invention, which differs from the above-mentioned fourth preferred embodiment in the multiple-network-community management system 500 further additionally comprising a trading/marketing module 150, a subgroup module 160, a chat module 161, a bulletin module 162 and an audio/visual module 163, all of which operate as same as above mentioned.

Description for implementation of this preferred embodiment can be referred to the second preferred embodiment and therefore are omitted hereinafter.

Figure 6:
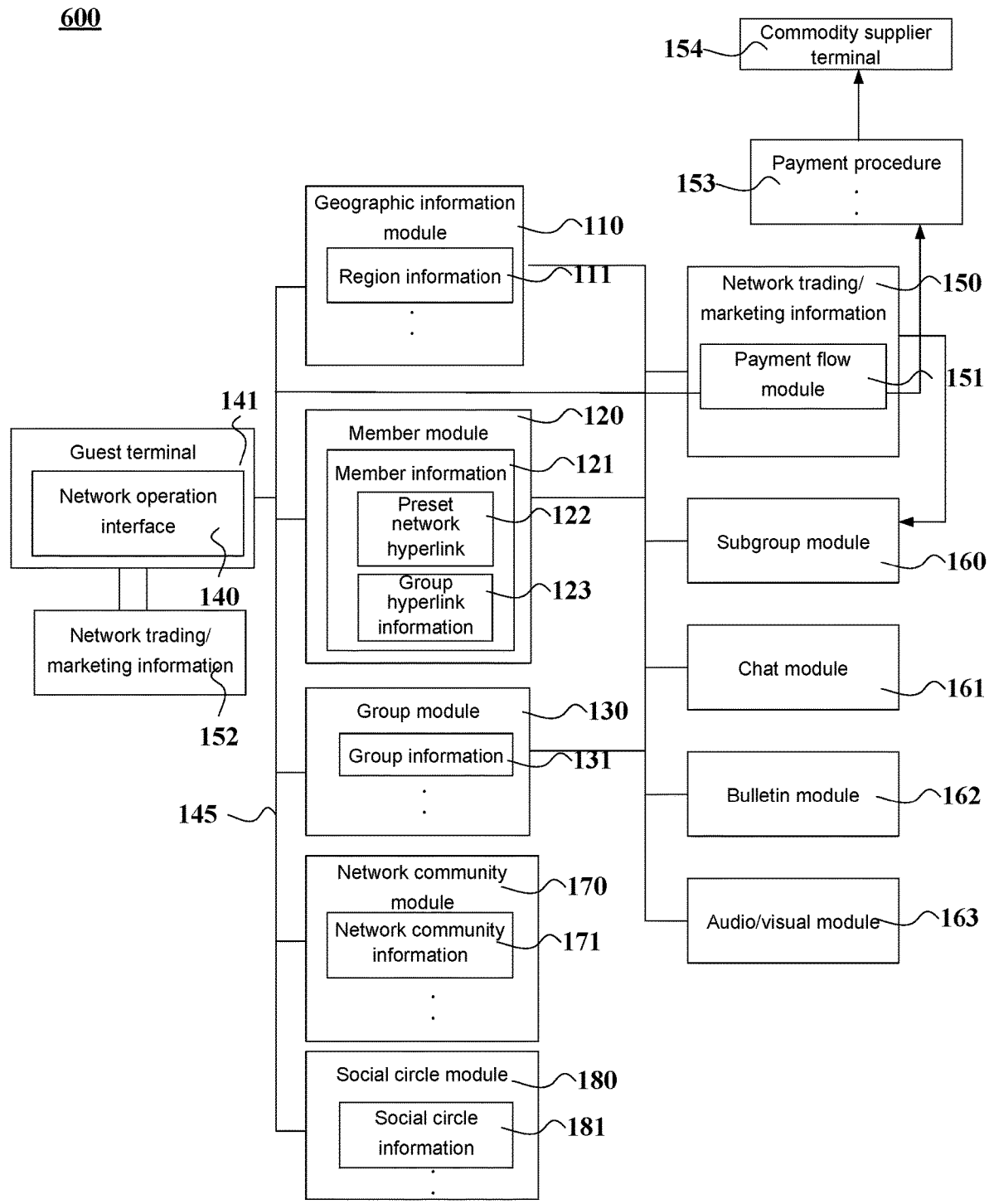
FIG. 6 depicts a schematically architectural diagram of a multiple-network-community management system of a sixth preferred embodiment in accordance with the present invention.

FIG. 6 depicts a schematically architectural diagram of a multiple-network-community management system 600 of a sixth preferred embodiment in accordance with the present invention, which differs from the above-mentioned fifth preferred embodiment in increasing a commodity supplier terminal 154 which operates as same as above mentioned.

Description for implementation of this preferred embodiment can be referred to the third preferred embodiment and therefore are omitted hereinafter.

Figure 7:
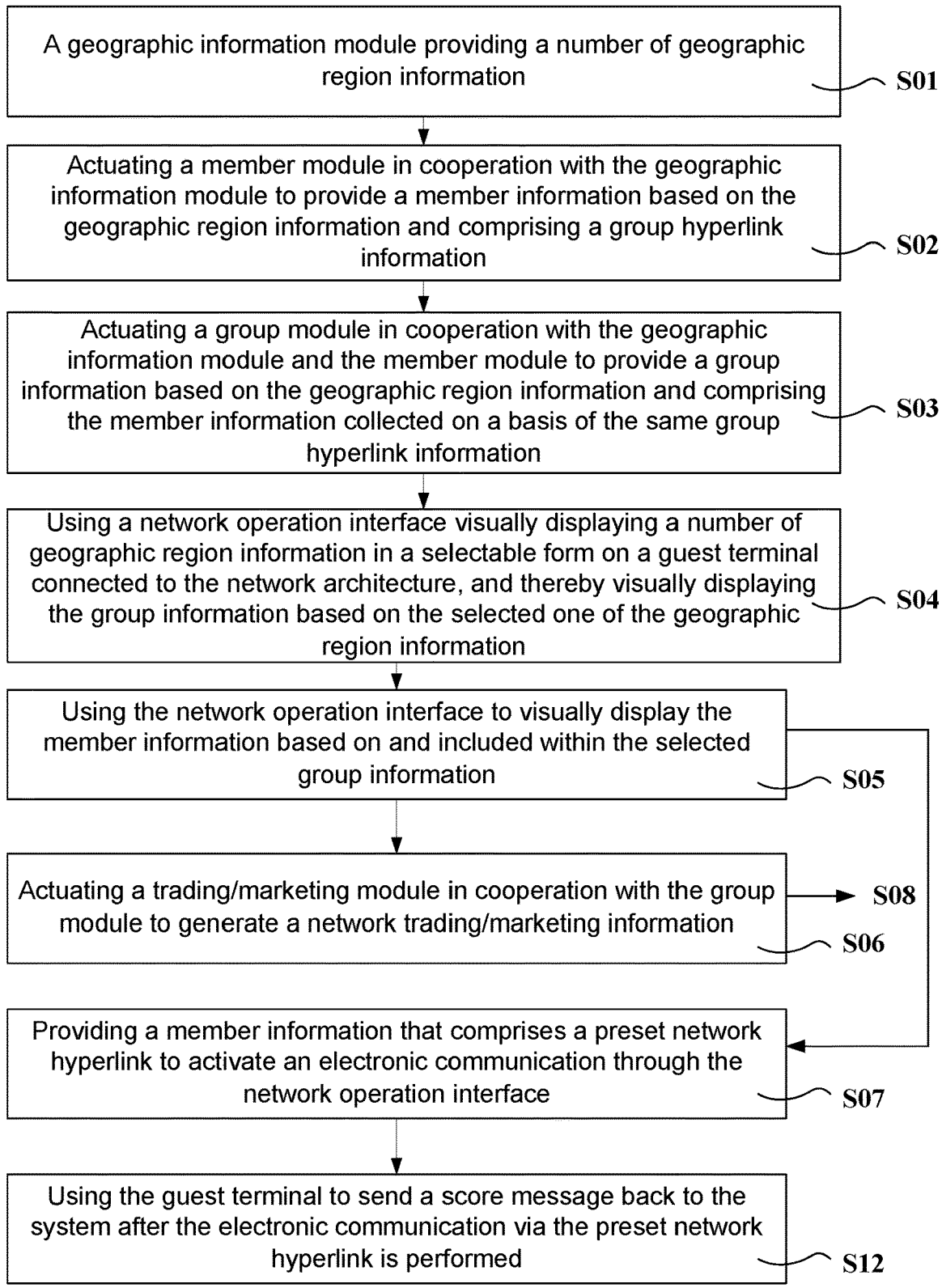
FIGS. 7-8 depict flow charts of a method of managing multiple network communities in accordance with the present invention.
Figure 8:
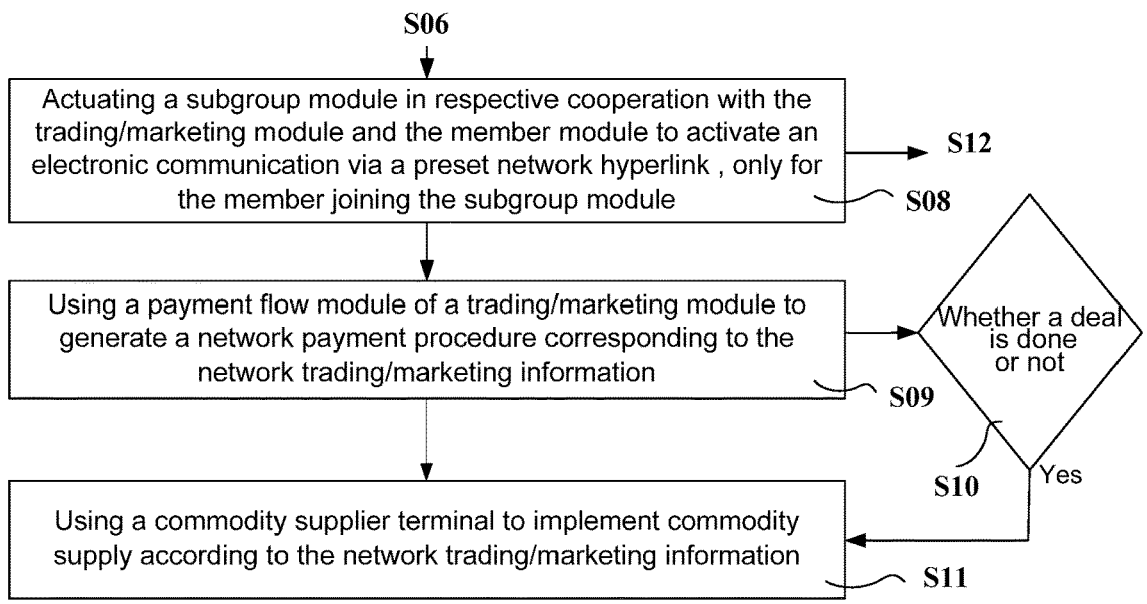

FIGS. 7-8 depict flow charts of a method of managing multiple network communities in accordance with the present invention, which are implemented with accompanying the above-mentioned network community management systems. The related system architectures and components' numeral references can be referred to above-mentioned respective preferred embodiments and therefore are omitted hereinafter. In the method, firstly, performing a step S01 is using a geographic information module 110 to provide a number of geographic region information 111. Next, performing a step S02 is actuating a member module 120 in cooperation with the geographic information module 110, to provide a member information 121 based on the geographic region information 111, wherein the member information 121 comprises a group hyperlink information 123. Next, performing a step S03 is actuating a group module 130 in cooperation with the geographic information module 110 and the member module 120, to provide a group information 131 based on the geographic region information 111 and comprising the member information 121 collected on a basis of the same group hyperlink information 123. Next, performing a step S04 is using a network operation interface 140 visually displaying a number of geographic region information 111 in a selectable form on a guest terminal 141 connected to the network architecture 145, and thereby further visually displaying the group information 131 in a selectable form based on the selected one of geographic region information 111. Next, performing a step S05 is using the network operation interface 140 to further visually display the member information 121 based on and included within the selected group information 131. Next, performing a step S06 is actuating a trading/marketing module 150 in cooperation with the group module 130, thereby generating a network trading/marketing information 152. Next, performing a step S08 is actuating a subgroup module 160 in respective cooperation with the trading/marketing module 150 and the member module 120, to activate an electronic communication via a preset network hyperlink 122, only for the members joining a subgroup provided from the subgroup module 160. Next, performing a step S09 is using a payment flow module 151 of the trading/marketing module 150 to generate a network payment procedure 153 corresponding to the network trading/marketing information 152. Next, performing a step S10 is determining whether a deal is done or not. If so, performing a step S11 is using a commodity supplier terminal 154 to implement commodity supply in accordance with the network trading/marketing information 152. After the step S08 is performed, also performing a step S12 is using the guest terminal 141 to send a score message back to the system after the electronic communication via the preset network hyperlink 122 is performed. Meanwhile, after performing the step S05, also performing a step S07 is to provide a member information 121 in selected one of the group information 131, which comprises a preset network hyperlink 122 to activate an electronic communication through the network operation interface 140.

Figure 9:
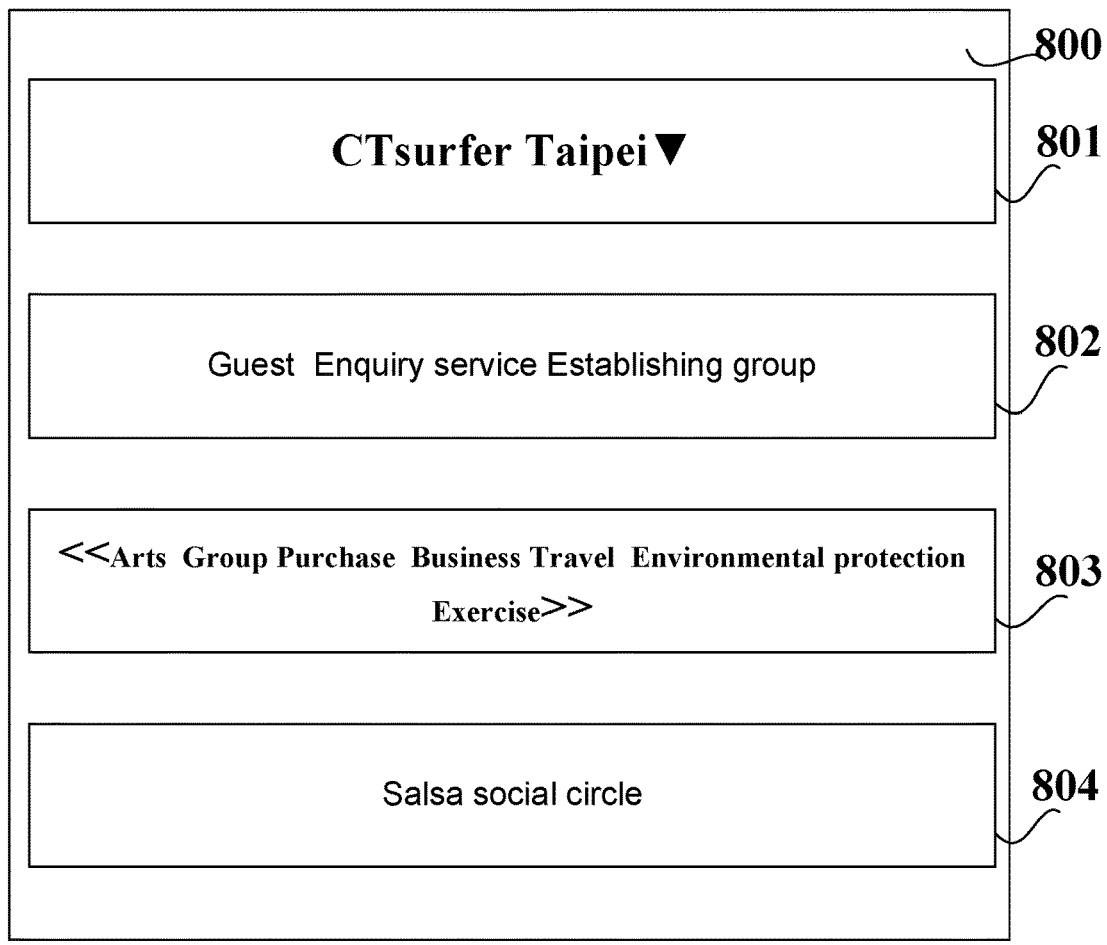
FIG. 9 depicts a schematic screen view of an exemplar operation of the system in accordance with the present invention, which is rendered in a handheld device.

FIG. 9 depicts a schematic screen view of exemplar operation of a multiple-network-community management system 800 in accordance with the present invention, which is rendered in a mobile device or computerized device. The related system architectures and components' numeral references can be referred to above-mentioned respective preferred embodiments and therefore are omitted hereinafter. As shown, a selected item 801 rendered with "CTsurfer Taipei" represents that selected one of the geographic region information 111 provided from the geographic information module 110 is "Taipei". A selected item 802 rendered with "guest enquiry service establishing group", represents that the member module 120, the group module 130, the network operation interface 140 are being activated respectively for performing "guest", "enquiry service" and "establish group" functions. A selected item 803 rendered with "<<Arts>>", represents that selected one of the network community information provided from the network community module 170 is a arts community. A selected item 804 rendered with "<<Salsa social circle>>", represents that selected one of the social circle information provided from the social circle module 180 is a 'Salsa' social circle. After a user select in turns a region information (e.g. Taipei), a network community information (e.g. Arts) and a social circle information (e.g. Salsa) based on what the user wants, the multiple-network-community management system 800 will visually display all of the group information (e.g. Teacher Chang's Salsa teaching, Teacher Lee's Salsa teaching and so forth) under this regional level classification on next operating screen. Furthermore, "enquiry service" labeled in the selected item 802 can make the user inquiring a group member who provides enquiry service, under the selected region information (e.g. Taipei), the selected network community information (e.g. Arts), the social circle information (e.g. Salsa) and the selected Salsa group. In an exemplar, with the enquiry service function, a user can firstly activate an electronic communication with any one specific member in Taipei via the preset network hyperlink 122. The introduction relative to the enquiry service function can be referred to the above mentioned and therefore is omitted hereinafter. Alternatively, after the user can also join any one group, the user inquires a specific member of the different group under the arts community about advice from the different group. Moreover, the user can also inquire a specific member of the Salsa group about advices from the different Salsa group. Certainly, the user can also directly inquire a specific member joined in Teacher Chang's Salsa teaching about opinion for the Teacher Chang's Salsa teaching. The system can also operate with a desktop computer, a tablet computer and so on, which have different interfaces, and is not limited to a handheld device.

Figure 10:
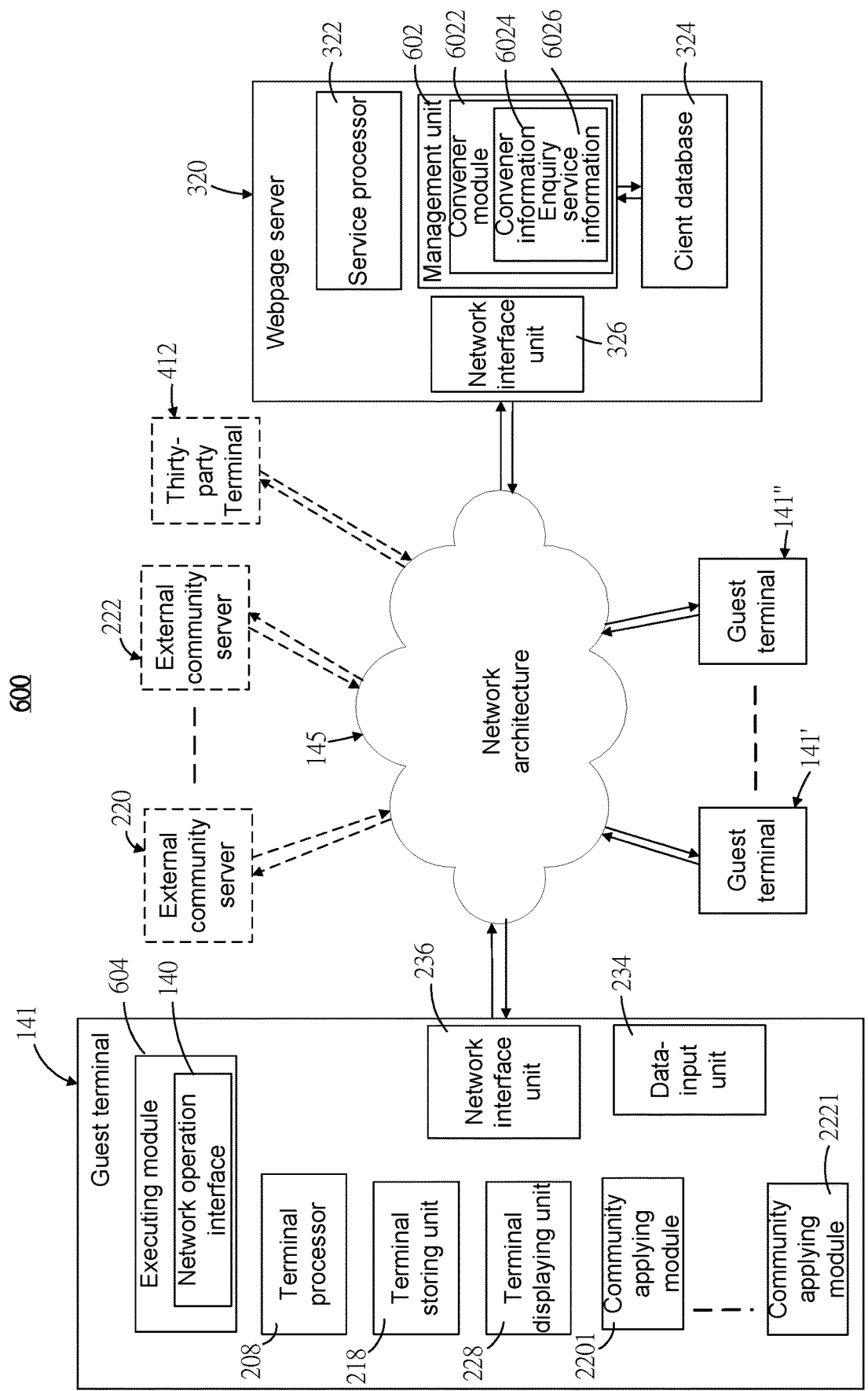
FIG. 10 depicts a schematically architectural diagram of a multiple-network-community management system of a sixth preferred embodiment in accordance with the present invention, which is configured to deploy with various kinds of computerized devices.

FIG. 10 depicts a schematically architectural diagram of a multiple-network-community management system 600 of the above-mentioned sixth preferred embodiment in accordance with the present invention, which is actually deployed with various kinds of computerized device. As shown in FIG. 10, the multiple-network-community management system 600 is implemented on a basic architecture where at least one guest terminal 141, 141', 141", a webpage server 320 and a network architecture 145 electrically interconnected among lost of computerized devices such as the at least one guest terminal 141 and the webpage server 320 constitute. In another application, depending upon different demands, a number of guest terminals 141, 141', 141" can be online connected to the multiple-network-community management system 600 through the network architecture 145 at the same or different time, whereas the multiple-network-community management system 600 can run therewith at the same time, for providing the number of guest terminals 141, 141', 141" with various service tasks. In this application, each of the guest terminals 141, 141', 141" comprises, but not limited to, one of a handheld mobile device, a smart phone, a computer and the other computerized device. The network architecture 145 comprises, but not limited to, one of a telecommunication network, a local network, the Internet and a combination of the number thereof. The webpage server 320 as a computerized device comprises, but not limited to, a network application program, which is configured to receive a request conformable with HTTP protocol, and/or send a webpage conformable with HTML format.

As shown in FIG. 10, each of the guest terminals 141, 141', 141" comprises but not limited to: a terminal processor 208, an executing module 604, a terminal storing unit 218, a terminal displaying unit 228, a network interface unit 236, a data-input unit 234, and 'n' community applying modules 2201, 2221, wherein the terminal processor 208 is configured to control and coordinate the performed tasks of/among the executing module 604, the terminal storing unit 218, the terminal displaying unit 228, the network interface unit 236, the data-input unit 234 and the 'n' community applying modules 2201, 2221. The webpage server 320 comprises but not limited to: a service processor 322, a management unit 602, a client database 324 and a network interface unit 326, wherein the service processor 322 is configured to control and coordinate the performed tasks of/among the management unit 602, the client database 324 and the network interface unit 326. By utilizing the network interface unit 236 of each of the guest terminals 141, 141', 141" in connection and cooperation with the corresponding network interface unit 326 of the webpage server 320 through the network architecture 145, digital information can be mutually transmitted among the guest terminals 141, 141', 141" and the webpage server 20, thereby facilitating one of the terminal processor 208 of each of the guest terminals 141, 141', 141" and the service processor 322 of the webpage server 20 to manipulate the digital information transmitted from another one. The 'n' community applying modules 2201, 2221, such as those commonly-known mobile application programs (APPs), in each of the guest terminals 141, 141', 141" can be achieved from the external 'n' corresponding community servers 220, 222 of the external commonly-known network community websites, such as FACEBOOK, LINE, TWITTER, GOOGLE+, WeChat and so forth, through the network architecture 145, for achieving external services for the system 600.

Figure 11:
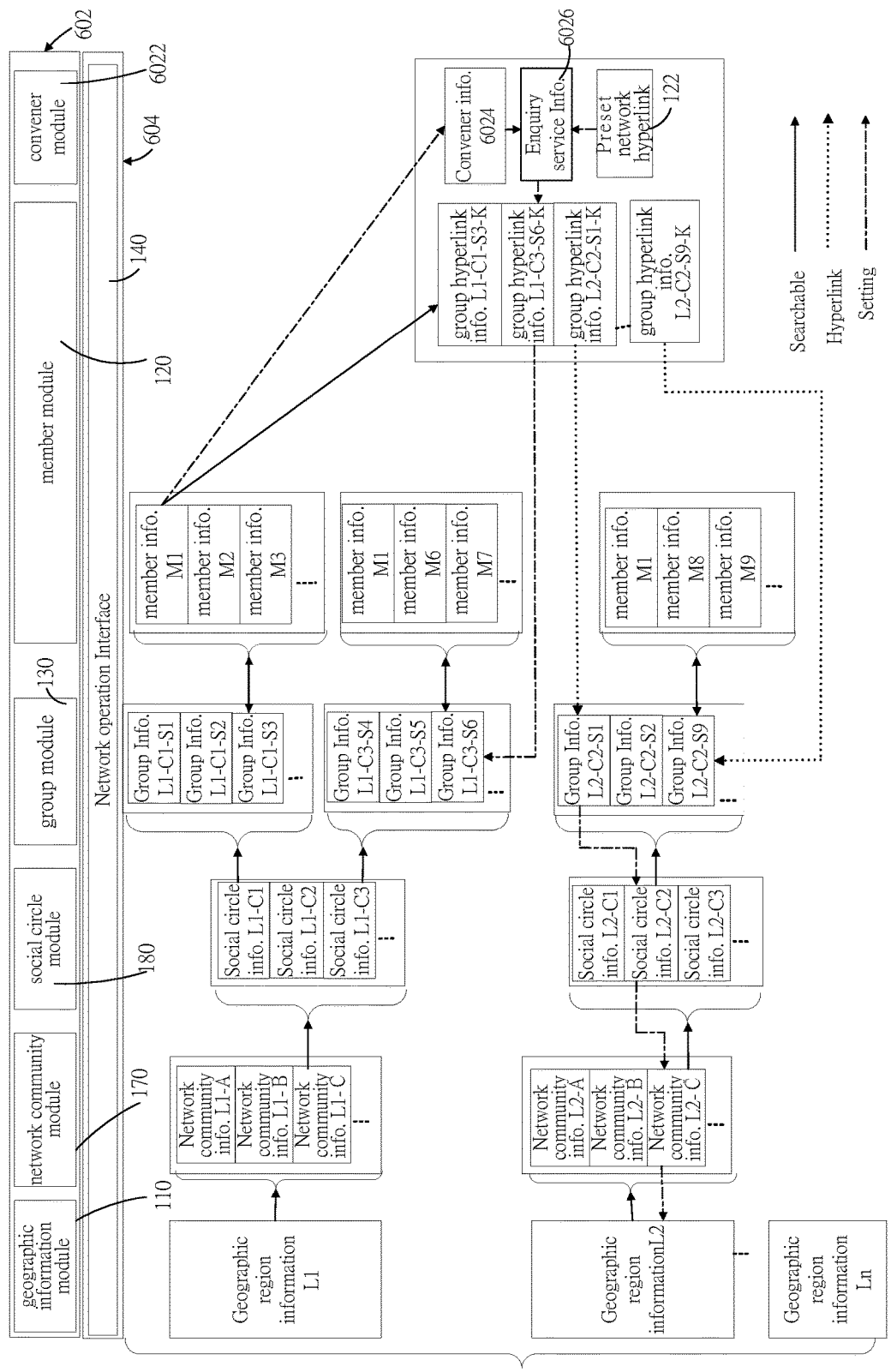
FIG. 11 depicts a practice exemplar of a multiple-network-community management system of a sixth preferred embodiment in accordance with the present invention.

Further referring to illustrations of FIGS. 6, 10 and 11, the executing module 604 of each of the guest terminals 141, 141', 141" comprises the network operation interface 140 (i.e. a webpage browser), the management unit 602 of the webpage server 320 comprises but not limited to all of the modules (as referred to FIG. 6) as described in the above-mentioned sixth preferred embodiment. The executing module 604 of each of the guest terminals 141, 141', 141" is actuated in cooperation with the management unit 602 of the webpage server 320 through the network architecture 145, thereby facilitating the multiple-network-community management system 600 having a capability of performing lots of service tasks. For example, the lots of service tasks comprises but not limited to as following:

(1) After actuated, the executing module 604 of any one of the guest terminals 141, 141', 141" actively transmits a request of URL corresponding to the webpage server 320, to the management unit 602 of the webpage server 320, thereby visually displaying a management webpage relative to the multiple-network-community management system 600 through the network operation interface 140 (i.e. the webpage browser), on the terminal displaying unit 228 (e.g. a display screen), wherein the management webpage prompts a instant Push Notification Service function thereon;

(2) The executing module 604 of any one of the guest terminals 141, 141', 141" is configured to save a part of or all of the digital information (e.g. a member information 121 or a group information 131), input from the data-input unit 234 (e.g. key pads, a mouse or a touching-control display) and with corresponding to the management webpage, into the terminal storing unit 218 (e.g. its local memory), and then through the network architecture 145, transmit it to the management unit 602 of the webpage server 320 for further information manipulation, including storing the information into the client database 324;

(3) The executing module 604 of any one of the guest terminals 141, 141', 141" is configured to transmit requests, input from the data-input unit 234 and with corresponding to the management webpage, to the management unit 602 of the webpage server 320 through the network architecture 145, for further information manipulation. Afterward, the management unit 602 of the webpage server 320 for the information manipulation will transmit a manipulated-result response back to the executing module 604 through the network architecture 145, whereby the manipulated-result response transmitted back through the network operation interface 140 will be visually displayed on the terminal displaying unit 228 and/or saved into the terminal storing unit 218 (as the local memory). The manipulated-result response comprises but not limited to the digital information generated from the respective modules (as shown in FIG. 6) included within the management unit 602, or the digital information (e.g. the group hyperlink information 123) provided from the client database 324 and used for the respective modules (as shown in FIG. 6);

(4) Any one of the guest terminals 141, 141', 141" and the webpage server 320 commonly perform each of the steps S01~S12 included in the method of managing multiple network communities as above-illustrated in FIGS. 7 and 8;

(5) The respective guest terminals 141, 141', 141" can utilize the preset network hyperlinks 122 of the number of the member information 121 provided from the member module 120 (as shown in FIG. 6) include within the management unit 602 of the webpage server 320, to generate an electronic communication thereamong in a management webpage environment created by the network operation interface 140 of the executing module 604, or utilize the member module 120 and the subgroup module 160 (as shown in FIG. 6) included within the management unit 602, to generate a subgroup information thereamong in a management webpage environment created by the network operation interface 140 of the executing module 604, for establishing a private-group electronic communication;

(6) The management webpage created by the network operation interface 140 in the executing module 604 of any one of the guest terminals 141, 141', 141" can be utilized to activate least one of the community applying modules 2201, 2221 for further transmitting an external community message containing the URL ("Uniform Resource Locator") of the webpage server 320 to a specified thirty-party terminal 412 (e.g. another external terminal in a friendship connection to the guest terminals 141, 141', 141") outside the system 600, through the network architecture 145 and the external community server 220, 222 corresponding to the at least one community applying module 2201, 2221. While the thirty-party terminal 412 is hyperlinked to the management unit 602 of the webpage server 320 by way of receiving and using the external community message containing the URL of the webpage server 320, the thirty-party terminal 412 can achieve various services provided from the management unit 602 of the webpage server 320;

(7) Further referring to illustrations of FIGS. 6 and 10, the client database 324 of the webpage server 320, and the geographic information module 110, the member module 120, the network community module 170, the social circle module 180, the group module 130 and a convener module 6022 included within the management unit 602 are utilized to generate a classification-based information settable menu in a selectable form on the management webpage of the network operation interface 140 in the executing module 604 of any one of the guest terminals 141, 141', 141". The classification-based information settable menu has an operation function similar to a drop-down function menu of the presently-known webpage browser, and can access from a multi-level information-classified architecture 1100 (as shown in FIG. 11) in the client database 324 of the webpage server 320. The multi-level information-classified architecture 1100 is pre-stored into the client database 324 of the webpage server 320, and depends upon the properties and classifying levels of different-kind information to pre-define various relationships among each of the geographic region information 111, the network community information 171 corresponding to each of the geographic region information 111, the social circle information 181 corresponding to each of the at least one network community information 171, the group information 131 corresponding to each of the social circle information 181, the member information 121 corresponding to each of the group information 131, and the group hyperlink information 123 and the preset network hyperlink 122 both corresponding to each of the member information 121. Further referring to FIGS. 10 and 11, with selected different-setting items in the classification-based information settable menu of the network operation interface 140 of the executing module 604 of one of the guest terminal 141 and the convener module 6022, the existing member information M1 corresponding to the guest terminal 141 is used by the corresponding guest terminal 141 to pre-create a new group information (e.g. a new group's name called 'L1-C3-S6') relative to a newly-created group, thereby updating a context of the existing member information 'M1' in adding a new group hyperlink information 'L1-C3-S6-K' about the new group information 'L1-C3-S6'. According to an information classification principle of the classification-based information settable menu (having an operation function similar to a drop-down function menu of the present webpage browser), the guest terminal 141 determines in turns (as drop-down clicking) the geographic region information (e.g. a geographic region's name called "L1") where the newly-created group information (e.g. the new group's name called 'L1-C3-S6') belongs, the network community information (e.g. a network community's name called 'L1-C'), and the social circle information (e.g. a social circle's name called 'L1-C3'), by way of various selectable items of the classification-based information settable menu; at the same time, the updated member information 'M1' (as corresponding to the guest terminal 141) will be actively joined by the convener module 6022 into a convener information 6024 where the newly-created group information 'L1-C3-S6' belongs, and into an enquiry service information 6026 based on the convener information 6024. For example, the enquiry service information 6026 comprises the preset network hyperlink 122 where the updated member information 'M1' belongs, for activating a real-time electronic communication with the other guest terminals. The information relationships among the newly-created group information 'L1-C3-S6', the corresponding geographic region information 'L1' where the newly-created group information 'L1-C3-S6' belongs, the corresponding network community information 'L1-C' and the corresponding social circle information 'L1-C3', the updated member information 'M1', the convener information 6024 and the enquiry service information 6026 are redefined to the multi-level information-classified architecture 1100. The redefined multi-level information-classified architecture 1100 will be restored into the client database 324 (as shown in FIG. 6). The convener module 6022 allows that the guest terminal 141 (treated as an convener) who creates the newly-created group information 'L1-C3-S6', has an operatable authorization higher than the other guest terminals 'M6', 'M7' . . . (as the other members) who are joined to the newly-created group information 'L1-C3-S6', in accessing and editing the convener information 6024, the newly-created group information 'L1-C3-S6' and the enquiry service information 6026. For example, the convener information 6024 comprises but not limited to, operations for payment setting about a third-party payment, bill setting, blacklist setting, order management setting, customer service setting and so forth. With regard to the payment setting of a third-party payment, the convener module 6022 is actuated in cooperation with the trading/marketing module 150 (as shown in FIG. 6); and (8) Further referring to FIGS. 6 and 10, by utilizing the client database 324 of the webpage server 320, and the member module 120, the network community module 170, the social circle module 180 and the group module 130 (as shown in FIG. 6) included within the management unit 602, a classification-based information searchable menu is visually displayed on the management webpage generated from the network operation interface 140 of the executing module 604 of any one of the guest terminals 141, 141', 141". The classification-based information searchable menu (as shown in FIG. 9) also provides an operation function similar to a drop-down function menu of the presently-known webpage browser, and can access the client database 324 of the webpage server 320 to read out the above-mentioned multi-level information-classified architecture 1100 (as shown in FIG. 11). In the selectable different-search items listed in the classification-based information searchable menu, a variety of information, including the geographic region information 111, the network community information 171, the social circle information 181, the group information 131 and the member information 121' can be visually displayed for further dropdown clicking. Further referring to FIGS. 10 and 11, by dropdown clicking sequentially the selected search items in the classification-based information searchable menu of the network operation interface 140 of any one of the guest terminals 141, 141', 141", one of the geographic region information (e.g. a geographic region's name called "L1") where a to-be-searched group information (e.g. a group's name called "L1-C1-S3") belongs, one of the network community information (e.g. a network community's name called 'L1-C'), and one of the social circle information (e.g. a social circle's name called 'L1-C1') can be determined in turns, whereby no matter whether the number of the geographic region information 'L1', 'L2', Ln, . . . are different or the same, it can make the guest terminal 141 convenient to rapidly filter the to-be-searched group information 'L1-C1-S3' or the member information 'M1', 'M2', 'M3' . . . included therein. By the comparison with the above-mentioned, the search interfaces of those presently-known community webpage, such as FACEBOOK, LINE, TWITTER, GOOGLE+, WeChat and so on, might collect a huge amount of information mixing up a variety of member information and/or group information (containing the chat information/the audio/voice information), without efficient multi-level classification for different-property information. This will easily cause trending, spamming, and inconvenient/difficult operation, for rapidly and exactly searching specific member information and/or group information from those presently-known community webpage.

As shown in FIG. 11, in a practiced exemplar of a multiple-network-community management system of a sixth preferred embodiment in accordance with the present invention, the multi-level information-classified architecture 1100 depends upon different properties and levels of the different information to define the relationships among a number of geographic region information, a number of network community information, a number of social circle information, a number of group information, a number of member information. For example, as shown in FIGS. 10 and 11, while the multiple-network-community management system 600 of the present invention is initially activated, the network operation interface 140 of the guest terminal 141 generates the classification-based information searchable menu on a basis of the multi-level information-classified architecture 1100, wherein the classification-based information searchable menu renders a number of geographic region information 'L1', 'L2', . . . 'Ln' in a selectable form; next, after a geographic region information 'L1' in the classification-based information searchable menu of the network operation interface 140 of the guest terminal 141 is determined, the classification-based information searchable menu further renders a number of related network community information 'L1-A', 'L1-B', 'L1-C', . . . in a selectable form under the determined geographic region information 'L1'; next, after one 11-C' of the network community information listed in the classification-based information searchable menu of the network operation interface 140 of the guest terminal 141 is determined, the classification-based information searchable menu further renders a number of related social circle information 'L1-C1', 'L1-C3' . . . in a selectable form under the network community information 'L1-C'; next, after one 'L1-C1' of the social circle information listed in the classification-based information searchable menu of the network operation interface 140 of the guest terminals 141, 141', 141" is determined, the classification-based information searchable menu further renders a number of related group information 'L1-C1-S1', 'L1-C1-S2', 'L1-C1-S3' . . . in a selectable form under the determined social circle information 'L1-C1'; next, after one 'L1-C1-S3' of the group information listed in the classification-based information searchable menu of the network operation interface 140 of the guest terminal 141 is determined, the classification-based information searchable menu further renders a number of related member information 'M1', 'M2', 'M3' . . . in a selectable form under the determined group information 'L1-C1-S3'; next, after one 'M1' of the member information listed in the classification-based information searchable menu of the network operation interface 140 of the guest terminal 141 is determined, the classification-based information searchable menu further render a number of related group hyperlink information 'L1-C1-S3-K', 'L1-C3-S6-K', 'L2-C2-S9-K', 'L2-C2-S9-K' . . . (i.e. all of the groups where a specific member joins) in a selectable form under the determined member information 'M1'; next, after one 'L2-C2-S1-K' of the group hyperlink information listed in the classification-based information searchable menu of the network operation interface 140 of the guest terminal 141 is determined, the classification-based information searchable menu further is hyperlinked to the group information 'L2-C2-S1' by way of the determined group hyperlink information 'L2-C2-S1-K', or after another group hyperlink information 'L2-C2-S9-K' is determined, the classification-based information searchable menu further is hyperlinked to the group information 'L2-C2-S9' by the determined group hyperlink information 'L2-C2-S9-K'. If further operation, after the group information 'L2-C2-S9' listed in the classification-based information searchable menu is determined, the classification-based information searchable menu further lists a number of member information 'M1', 'M8', 'M9' . . . corresponding to the group information 'L2-C2-S9'. By the above-mentioned information classification filter depending upon different property and levels of different information, each of the guest terminals 141, 141', 141" can rapidly find the required or to-be-realized member information or group information, rather than operation questions of desultoriness and poor user friendly in precisely searching the required information by the human-machine interfaces of the presently-known community websites. By rapid search among different member information of different group information, the multiple-network-community management system of the present invention make different-region groups rapidly connected with each other together, to implement mutual communication and trading thereamong.

Compared with the prior arts, the present invention utilize a convener module to prompt the same/different group members convenient to establish the respective regional groups (as groups full of mutual communicating activities) over the world; next, by the multiple-network-community management system of the present invention, lots of the traditional regionally groups (in the same social circle and network community) over the world can be connected with each other together, and one of the terminals corresponding to a specific group member information can be set as a group convener information by the convener module group to use specific function such as news bulletin, blocking member (for prohibiting group member's harassment) in the group information. By correspondingly connecting the information in the member module and the group module with the geographic information module, the present invention can make each of the regional groups to run business under a globalized Information architecture. For those small traditional enterprises owning groups, the present invention does not only make those enterprises obtaining opportunities to grow into globalized multinational corporations but also make those enterprises more convenient to concatenate the other groups over the world so as to cooperate in expanding business. For the respective group members, with the system of the present invention, this does not make them instantly intercommunicated with the other same-hobbit members but also make them rapidly blending into local life while mobile life among multi-cities cities at some time.

As described above, although the present disclosure has been described with the preferred embodiments thereof, those skilled in the art will appreciate that various modifications, additions, and substitutions are possible without departing from the scope and the spirit of the disclosure. Accordingly, the scope of the present disclosure is intended to be defined only by reference to the claims.

What is claimed is:

1. A multiple-network-community management system, deployed on a basis of a network architecture, comprising: a plurality of computerized devices electrically interconnected via the network architecture, including at least one guest terminal and a webpage server connected to the at least one guest terminal that is one of a handheld mobile device, a smart phone and a computer, and has a terminal processor and a network operation interface controlled by the terminal processor, wherein the webpage server has a service processor and a client database which is controlled by the service processor and stores a multi-level information-classified architecture which defines several relationships among a plurality of records of geographic region information, a plurality of records of network community information, a plurality of records of social circle information, a plurality of records of group information, a plurality of records of member information and a plurality of records of group hyperlink information, in accordance with the plurality of records of geographic region information respectively containing names representative of the plurality of records of network community information, the plurality of records of network community information respectively containing names representative of the plurality of records of social circle information, the plurality of records of social circle information respectively containing names representative of the plurality of records of group information, the plurality of records of group information respectively containing person names representative of the plurality of records of member information, the plurality of records of member information respectively containing names representative of the plurality of records of group hyperlink information, and the plurality of records of group hyperlink information respectively containing hyperlink names representative of the plurality of records of group information, and the at least one guest terminal and the webpage server both collocate to perform a multi-level information classification filter in accordance with the following service tasks which comprises: the webpage server providing the plurality of records of geographic region information defined by the multi-level information-classified architecture, and then the network operation interface of the at least one guest terminal in cooperation with the webpage server through the network architecture, visually displaying the plurality of records of geographic region information in a selectable form on the at least one guest terminal; next, the webpage server providing the plurality of records of network community information, which are defined by the multi-level information-classified architecture and base on the plurality of records of geographic region information, and then the network operation interface of the at least one guest terminal in cooperation with the webpage server through the network architecture, sequentially visually displaying first ones of the plurality of records of network community information in response to determined first one of the plurality of records of geographic region information, based on a relationship that the first records of network community information all contain the name of the determined first record of geographic region information; next, the webpage server providing a plurality of records of social circle information, which are defined by the multi-level information-classified architecture and based on both the plurality of records of geographic region information and the plurality of records of network community information, and then the network operation interface of the at least one guest terminal in cooperation with the webpage server through the network architecture, sequentially visually displaying first ones of the plurality of records of social circle information in response to determined one of the first records of network community information, based on a relationship that the first records of social circle information all contain the name of the determined first record of network community information; next, the webpage server providing the plurality of records of group information, which are defined by the multi-level information-classified architecture and based on both the plurality of records of geographic region information and the plurality of records of social circle information, and then the network operation interface of the at least one guest terminal in cooperation with the webpage server through the network architecture, sequentially visually displaying first ones of the plurality of records of group information in, response to determined one of the first records of social circle information, based on a relationship that the first records of group information all contain the name of the determined first record of social circle information; and next, the webpage server providing the plurality of records of member information, which are defined by the multi-level information-classified architecture and based on the plurality of records of geographic region information, and then the network operation interface of the at least one guest terminal in respective cooperation with the webpage server through the network architecture, sequentially visually displaying first ones of the plurality of records of member information in response to determined one of the first records of group information, based on a relationship that the first records of member information all contain the name of the determined first record of group information, and the first records of member information respectively corresponding to names of different members who join the determined first record of group information; next, the webpage server providing the plurality of records of group hyperlink information defined by the multi-level information-classified architecture, and then the network operation interface of the at least one guest terminal in cooperation with the webpage server through the network architecture, sequentially visually display a first record of group hyperlink information and a second record of group hyperlink information both included within the plurality of records of group hyperlink information, in response to determining the person name of one of the first records of member information, based on a relationship that the determined first record of member information contain the names of the first and second records of group hyperlink information, wherein the person name of the determined first record of member information is searched in such a way that after the determined first record of geographic region information, the determined first record of network community information, the determined first record of social circle information and the determined first record of group information are sequentially searched, and the first record of group hyperlink information corresponds to the determined first record of group information, and the second record of group hyperlink information corresponds to a second one of the plurality of records of group information wherein the name of the second record of group information is different from the name of any one of the related first records of group information; and then, the network operation interface of the at least one guest terminal in cooperation with the webpage server through the network architecture, further hyperlinks to the second record of group information in response to determining the second record of group hyperlink information; and then with hyperlinking the second record of group information, the network operation interface of the at least one guest terminal further provides a second one of the plurality of records of member information, and a person name of the second record of member information is different from the person name of any one of the first records of member information, resulted in such a way that, the first and second records of group information both or the first and second records of member information both are interconnected in a causal manner under the multiple-network-community management system is implemented.

2. The multiple-network-community management system according to claim 1, wherein the determined first record of member information further comprises a preset network hyperlink used to activate an electronic communication through the network operation interface.

3. The multiple-network-community management system according to claim 1, wherein the service tasks further comprise: the webpage server generating a network trading/marketing information.

4. The multiple-network-community management system according to claim 3, wherein the service tasks further comprise: the webpage server activating an electronic communication via a preset network hyperlink, only for a member joining a subgroup.

5. The multiple-network-community management system according to claim 4, wherein the service tasks further comprise: the webpage server generating at least one network payment procedure corresponding to the network trading/marketing information.

6. The multiple-network-community management system according to claim 5, wherein the service tasks further comprise: other terminal different from the at least one guest terminal, implementing a commodity supply in accordance with the network trading/marketing information.

7. The multiple-network-community management system according to claim 4, wherein the service tasks further comprise: the webpage server announcing at least one bulletined news, and uploading a multimedia information.

8. The multiple-network-community management system according to claim 1, wherein the at least one guest terminal sends a score message back to the system after finishing the electronic communication via the preset network hyperlink.

9. The multiple-network-community management system according to claim 1, wherein the at least one guest terminal further comprises at least one application program achieved from an external community server, wherein the network operation interface is utilized to activate the at least one application program, thereby transmitting an external community message, containing a URL of the webpage server, to a thirty-party terminal through the network architecture and the external community server corresponding to the at least one application program, the thirty-party terminal uses the external community message for connection with the webpage server, for achieving services provided from the multiple-network-community management system.

10. The multiple-network-community management system according to claim 1, wherein the network operation interface of the at least one guest terminal further comprises a classification-based information searchable menu, the classification-based information searchable menu is configured to achieve the multi-level information-classified architecture from the client database of the webpage server, for sequentially searching the determined first record of geographic region information, the determined first record of network community information, the determined first record of social circle information, the determined first record of group information, the determined first record of member information, and the first and second records of group hyperlink information.

11. The multiple-network-community management system according to claim 1, wherein the network operation interface of the at least one guest terminal further comprises a classification-based information settable menu which is configured to access the multi-level information-classified architecture from the client database of the webpage server, wherein, at least one of the plurality of records of member information is used to pre-create a new record of group information via both the classification-based information settable menu and the webpage server, and then the plurality of records of geographic region information, the plurality of records of network community information, and the plurality of records of social circle information are sequentially updated by the newly-created record of group information, for being saved back to the client database to redefined the multi-level information-classified architecture.

12. The multiple-network-community management system according to claim 11, wherein the at least one record of member information comprises a record of convener information where the newly-created record of group information belongs, and a record of enquiry service information where the record of convener information belongs, the record of enquiry service information comprises a preset network hyperlink where the at least one record of member information belong, for activating an electronic communication.

13. A multiple-network-community management system, deployed on a basis of a network architecture, comprising: a plurality of computerized devices interconnected via the network architecture, including at least one guest terminal and a webpage server connected to the at least one guest terminal that is one of a handheld mobile device, a smart phone and a computer, and has a terminal processor and a network operation interface controlled by the terminal processor, wherein the webpage server having has a service processor and a client database which is controlled by the service processor and stores a multi-level information-classified architecture which defines several relationships among a plurality of records of geographic region information, a plurality of records of network community information, a plurality of records of social circle information, a plurality of records of group information, a plurality of records of member information and a plurality of records of group hyperlink information, in accordance with the plurality of records of geographic region information respectively containing names representative of the plurality of records of network community information, the plurality of records of network community information respectively containing names representative of the plurality of records of social circle information, the plurality of records of social circle information respectively containing names representative of the plurality of records of group information, the plurality of records of group information respectively containing person names representative of the plurality of records of member information, the plurality of records of member information respectively containing names representative of the plurality of records of group hyperlink information, and the plurality of records of group hyperlink information respectively containing hyperlink names representative of the plurality of records of group information, and the at least one guest terminal and the webpage server both collocate to perform the following service tasks which comprises: the webpage server providing the plurality of records of geographic region information defined by the multi-level information-classified architecture, and then the network operation interface in cooperation with the webpage server through the network architecture, sequentially visually displaying the plurality of records of geographic region information in a selectable form on the at least one guest terminal; next, the webpage server providing the plurality of records of network community information, which are defined by the multi-level information-classified architecture and based on the plurality of records of geographic region information, and then the at least one guest terminal in cooperation with the webpage server through the network architecture, sequentially searching and visually displaying first ones of the plurality of records of network community information in response to determined first one of the plurality of records of geographic region information, based on a relationship that the first records of network community information all contain the name of the determined first record of geographic region information; next, the webpage server providing the plurality of records of social circle information, which are defined by the multi-level information-classified architecture and based on both the plurality of records of geographic region information and the plurality of records of network community information, and then the network operation interface of the at least one guest terminal in cooperation with the webpage server through the network architecture, sequentially searching and visually displaying first ones of the plurality of records of social circle information in response to determined one of the first records of network community information, based on a relationship that the first records of social circle information all contain the name of the determined first record of network community information; next, the webpage server providing the plurality of records of group information, which are defined by the multi-level information-classified architecture and based on both the plurality of records of geographic region information and the plurality of records of social circle information, and then the network operation interface of the at least one guest terminal in cooperation with the webpage server through the network architecture, sequentially searching and visually displaying first ones of the plurality of records of group information in response to determined one of the first records of social circle information, based on a relationship that the first records of group information all contain the name of the determined first record of social circle information; next, the webpage server providing the plurality of records of member information, which are defined by the multi-level information-classified architecture and based on the plurality of records of geographic region information, and then the network operation interface of the at least one guest terminal in cooperation with the webpage server through the network architecture, sequentially searching and visually displaying first ones of the plurality of records of member information in response to determined one of the first records of group information, based on a relationship that the first records of member information all contain the name of the determined first record of group information, and the first records of member information respectively corresponding to names of different members who join the determined first record of group information; and next, the webpage server providing the plurality of records of group hyperlink information defined by the multi-level information-classified architecture, and then the network operation interface of the at least one guest terminal in cooperation with the webpage server through the network architecture, sequentially searching and visually displaying a first record of group hyperlink information and a second record of group hyperlink information both included within the plurality of records of group hyperlink information, in a response to determining the person name of one of the first records of member information; wherein the at least one guest terminal uses the multi-level information-classified architecture to implement information classification filter, in an information-filtering sequence from the first records of geographic region information, through the first records of network community information, the first records of social circle information, the first records of group information and the first records of member information, to the first and second records of group hyperlink information, and then the at least one guest terminal rapidly filters a second record of group information that is hyperlinked by the second record of group hyperlink information, and a second record of member information which has a person name included in the second record of group information wherein a name representative of the second record of group information is different from the name of any one of the first records of group information, and the person name of the second record of member information is different from the person name of any one of the first records of member information.

* * * * *